US008724475B2

(12) United States Patent
Prescott et al.

(10) Patent No.: US 8,724,475 B2
(45) Date of Patent: May 13, 2014

(54) METHOD AND APPARATUS TO ESTIMATE THE SENDER'S CONGESTION WINDOW THROUGHOUT THE LIFE OF A TCP FLOW (SOCKET CONNECTION)

(75) Inventors: Dan Prescott, Elbert, CO (US); Bruce Kosbab, Colorado Springs, CO (US)

(73) Assignee: Fluke Corporation, Everett, WA (US)

( * ) Notice: Subject to any disclaimer, the term of this patent is extended or adjusted under 35 U.S.C. 154(b) by 115 days.

(21) Appl. No.: 13/117,049

(22) Filed: May 26, 2011

(65) Prior Publication Data

US 2012/0287794 A1 Nov. 15, 2012

Related U.S. Application Data

(63) Continuation-in-part of application No. 13/106,848, filed on May 12, 2011, now abandoned.

(51) Int. Cl.
*G01R 31/08* (2006.01)
*G08C 15/00* (2006.01)

(52) U.S. Cl.
USPC .......................................... 370/241; 370/235

(58) Field of Classification Search
CPC ................................ H04L 47/10; H04L 43/50
USPC .................................................. 370/241, 235
See application file for complete search history.

(56) References Cited

U.S. PATENT DOCUMENTS

| 6,757,248 | B1* | 6/2004 | Li et al. .......................... 370/235 |
| 2002/0154602 | A1* | 10/2002 | Garcia-Luna-Aceves et al. .............................. 370/230 |
| 2004/0133391 | A1* | 7/2004 | Bovo et al. ..................... 702/178 |
| 2004/0264366 | A1* | 12/2004 | Swami .......................... 370/229 |
| 2005/0243718 | A1* | 11/2005 | Coupechoux et al. ........ 370/229 |
| 2005/0265235 | A1* | 12/2005 | Accapadi et al. ............. 370/235 |
| 2007/0223492 | A1* | 9/2007 | Lee et al. .................. 370/395.52 |
| 2007/0280107 | A1* | 12/2007 | Ludwig et al. ................. 370/230 |
| 2009/0168720 | A1* | 7/2009 | Vinayakray-Jani et al. .. 370/331 |
| 2010/0329114 | A1* | 12/2010 | Chesson ....................... 370/232 |

OTHER PUBLICATIONS

Jaiswal S et al: "Inferring TCP connection characteristics through passive measurements", INFOCOM 2004. Twenty-Third Annual joint Conference of the IEEE Computer and Communications Societies, IEEE, Piscataway, NJ, USA, vol. 3, Mar. 7, 2004, pp. 1582-1592, XP010740523, DOI: 10.1109/INFCOM.2004.1354571 ISBN: 978-0-7803-8355-5 p. 1583, right-hand column, line 50-p. 1584, right-hand column, line 3.

* cited by examiner

*Primary Examiner* — Mark Rinehart
*Assistant Examiner* — Angel Brockman
(74) *Attorney, Agent, or Firm* — Edwards Wildman Palmer LLP; Scott D. Wofsy; Christopher J. Capelli

(57) ABSTRACT

Network monitoring method and apparatus estimates the congestion window throughout the life of a TCP flow (socket connection), providing information useful for network performance analysis and troubleshooting.

2 Claims, 3 Drawing Sheets

METHOD AND APPARATUS TO ESTIMATE THE SENDER'S CONGESTION WINDOW THROUGHOUT THE LIFE OF A TCP FLOW (SOCKET CONNECTION)

BACKGROUND OF THE INVENTION

This invention relates to networking, and more particularly to estimating a sender's congestion window throughout the life of a TCP flow.

In a computer networking environment, users may install and deploy monitoring and/or troubleshooting tools for observation of network traffic and network installation and maintenance. The TCP protocol provides a reliable transport mechanism between two machines on a network. Congestion window is a component in the TCP stack used for transmission flow control by a sender as a result of the sender's discernment of the amount of congestion on a network, whereas flow control by the receiver is accomplished via the advertised window, where the receiver indicates the additional amount of data the receiver is willing or able to receive. It would be useful to be able to estimate the congestion window of a sending device by passive observation of network traffic, a capability which heretofore has not been developed.

SUMMARY OF THE INVENTION

In accordance with the invention, the congestion window size for a sender can be estimated by observation of traffic on a network.

In accordance with the invention, the congestion window estimate is provided by passive observation of network traffic.

Accordingly, it is an object of the present invention to provide an improved system and method of network analysis that estimates congestion window.

It is a further object of the present invention to provide an improved network monitoring device that measures and reports a sender's congestion window, as well as minimum and maximum values during an observation.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DETAILED DESCRIPTION

The system according to a preferred embodiment of the present invention comprises a monitoring system and method and an analysis system and method for estimating the congestion window of a sender throughout the life of a TCP flow by observation of traffic.

Figure 1:
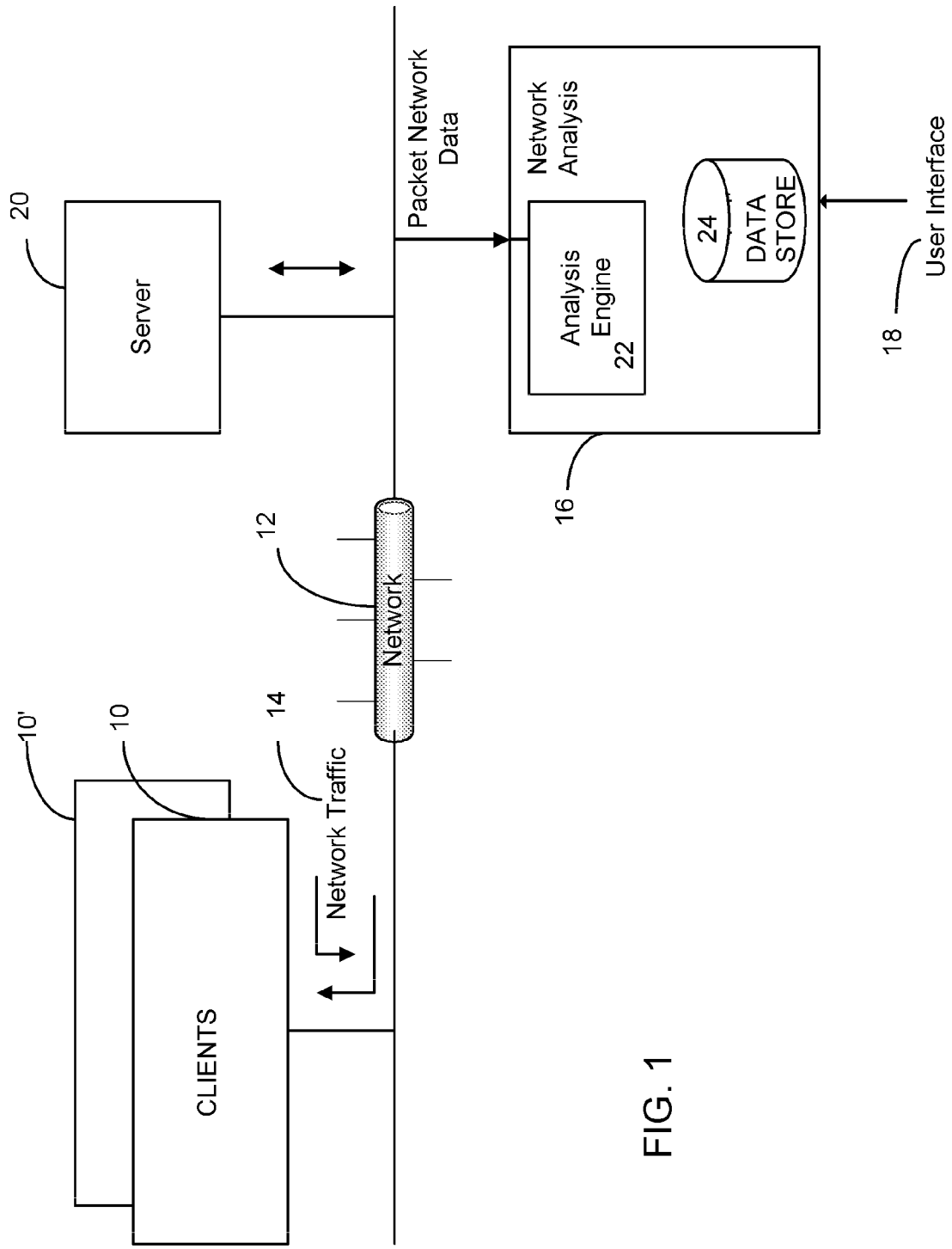
FIG. 1 is a block diagram of a network with a network analysis product interfaced therewith.

Referring to FIG. 1, a block diagram of a network with an apparatus in accordance with the disclosure herein, a network may comprise plural network clients 10, 10', etc., which communicate over a network 12 by sending and receiving network traffic 14 via interaction with server 20. The traffic may be sent in packet form, with varying protocols and formatting thereof.

A network analysis device 16 is also connected to the network, and may include a user interface 18 that enables a user to interact with the network analysis device to operate the analysis device and obtain data therefrom, whether at the location of installation or remotely from the physical location of the analysis product network attachment.

The network analysis device comprises hardware and software, CPU, memory, interfaces and the like to operate to connect to and monitor traffic on the network, as well as performing various testing and measurement operations, transmitting and receiving data and the like. When remote, the network analysis device typically is operated by running on a computer or workstation interfaced with the network.

The analysis device comprises an analysis engine 22 which receives the packet network data and interfaces with data store 24.

Figure 2:
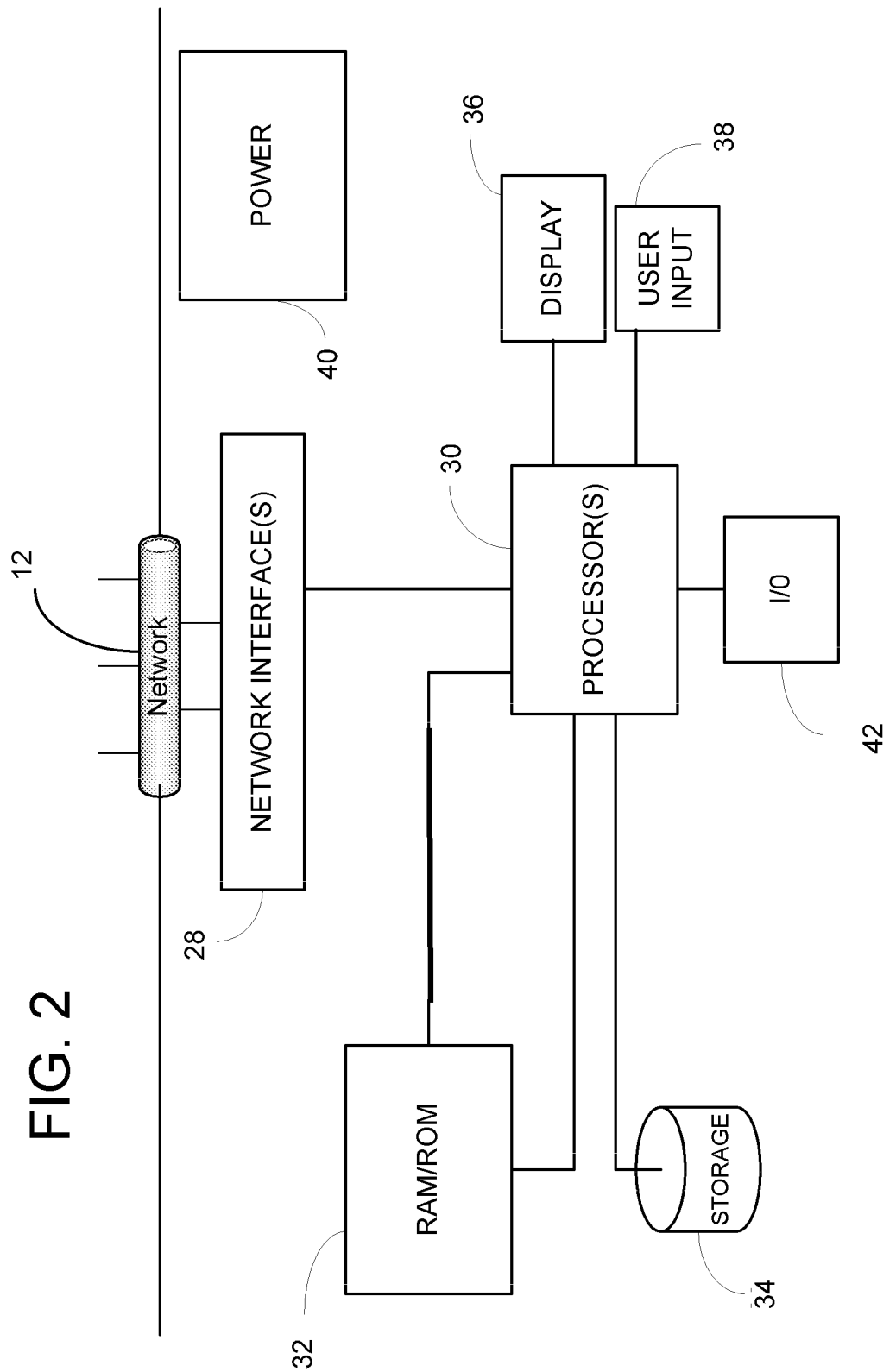
FIG. 2 is a block diagram of a monitor device for estimating congestion window throughout the life of a TCP flow.

FIG. 2 is a block diagram of a test instrument/analyzer 26 via which the invention can be implemented, wherein the instrument may include network interfaces 28 which attach the device to a network 12 via multiple ports, one or more processors 30 for operating the instrument, memory such as RAM/ROM 32 or persistent storage 34, display 36, user input devices 38 (such as, for example, keyboard, mouse or other pointing devices, touch screen, etc.), power supply 40 which may include battery or AC power supplies, other interface 42 which attaches the device to a network or other external devices (storage, other computer, etc.).

In operation, the network test instrument is attached to the network, and observes transmissions on the network to collect statistics thereon and to estimate the congestion window of a sender throughout the life of a TCP flow.

Figure 3:
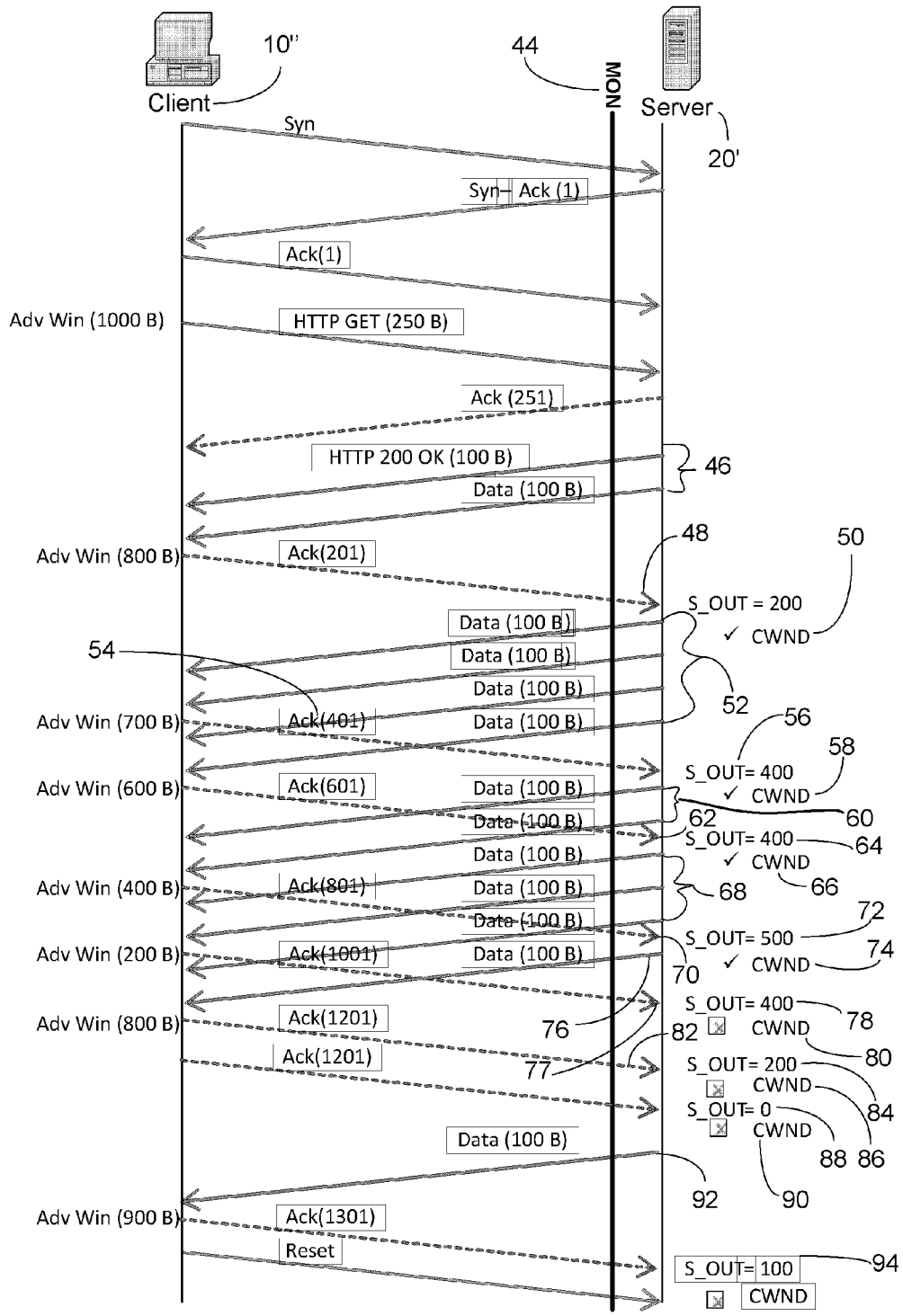
FIG. 3 is a flow diagram illustrating the estimation of congestion window for a server.

FIG. 3 is a flow diagram illustrating the environment and operation of the invention. Client 10" and server 20' are shown with the space therebetween depicting the network and traffic between the client and server. Monitor device 44 is illustrated as observing network traffic at a position on the network. In a particular embodiment, the monitor comprises a test instrument implementing the method, system and apparatus.

In the case where the monitor 44 can see both sides of the transaction, the congestion window is estimated as follows, by observation of the client's advertised window and data in flight determined as noted below, with reference to the illustrated communication example of client 10" making an HTTP GET request for data from server 20'.

Client 10" initiates the transaction by making a Syn request to begin the establishment of connection. Server 20' replies with Syn-Ack and client 10" responds with an Ack, acknowledging the sequence number. The client then issues an HTTP GET request, with an advertised window of 1000 bytes. The advertised window is checked for value against maximum and minimum prior values, and in this case the value of 1000 is a new maximum (the values were initialized to zero when the process newly started) so this value is saved as ADV_MAX (maximum advertised window during a monitoring period) for future reporting. Next, the server responds with an Ack (Ack(251)), and then begins sending data in two 100 byte packets (HTTP 200 OK (100 B) and Data (100 B)) at 46, sequence numbers 1 and 101. At 48, having observed an ACK from the client (Ack(201)) with an advertised window of 800B but just prior to processing of the Ack(201), it is determined by the monitor 44 that the amount of data outstanding (S_OUT) is 200 (201 (max server sequence number expected)−1 (max client acknowledgement)). This value is checked against a minimum congestion window value (which is in this example currently a zero value, indicating no minimum was yet set) and if lower than the current minimum (or if current minimum is zero) the congestion window minimum (CWND_MIN) is updated. In this particular example, CWND_MIN is now set to 200 (as well as congestion window maximum (CWND_MAX), as it was previously not set). Since the prior advertised window value prior to processing the ACK(201) is 1000, which is more than the calculated S_OUT value, it is determined that the value of S_OUT can be used as a congestion window estimate, indicated by the √CWND at 50 in FIG. 3.

Now, 4 packets of 100 bytes of data are sent at 52 (sequence numbers 201, 301, 401 and 501), after receiving sequence 301, the client sends Ack(401) at 54 with an advertised window of 700B. S_OUT is calculated to be 400 at 56 (601−201 acknowledged) prior to processing the ACK(401). Since the prior advertised window (800) is more than the outstanding bytes (400, the value S_OUT), the S_OUT value 400 at 56 can be employed as the congestion window value (indicated by the √CWND at 58). Maximum congestion window is updated to 400, and receiver advertised window minimum becomes 700. The highest acknowledged sequence is now updated to 401.

Two more data sequences 601 and 701 are sent by the server at 60, so the largest sequence number expected is now 801, and at 62 another ACK from the client is observed (ACK 601) with an advertised window of 600B, so S_OUT is determined to be 400 (highest data sequence seen, 801, minus highest prior ack, 401) and resulting S_OUT is 400 at 64 (801−401 acknowledged). The prior advertised window of 700 is larger than S_OUT, so the S_OUT value can be used as an estimate of congestion window, denoted by the √CWND at 66. Prior advertised window is now updated to 600 and highest acknowledged sequence is updated to 601.

Now the server sends out 3 more 100 B data packets (sequence numbers 801, 901, 1001) at 68 and ACK(801) is now seen at 70 with an advertised window of 400. S_OUT is 500 (1101 highest sequence expected minus 601 highest prior acknowledged) at 72. The value of S_OUT can be used as a congestion window value, because the prior advertised window of 600 is greater than the S_OUT value (500). CWND_MAX is updated to the new maximum value of 500. Now the highest observed prior ACK is updated to value 801 and prior advertised window is updated to 400.

One additional packet of data (sequence 1101) is sent, at 76 and Ack(1001) is observed with an advertised window of 200 at 77, so it is determined that S_OUT is 400 at 78 (sequence 1201 minus acknowledged 801). S_OUT is not used here as a congestion window estimate (indicated by X CWND at 80, because the value of outstanding bytes, S_OUT (400), is equal to the advertised window size, so the advertised window size from the receiver takes over controlling the transmission limiting, rather than congestion window control. Now the highest observed prior ACK is updated to value 1001 and prior advertised window is updated to 200.

Ack(1201) is subsequently received at the Server with advertised window size 800, but no higher outgoing data sequence number has been observed since the last ACK, so S_OUT is calculated as 200 after Ack(1201) at 84 (1201 sent sequence−1001 acknowledged). S_OUT is not used here as a congestion window estimate (indicated by X CWND at 86), because the value of outstanding bytes, S_OUT (200), is equal to the prior advertised window size 200, so the advertised window size from the receiver is still controlling the transmission limiting, rather than congestion window control. Now the highest observed prior ACK is updated to value 1201 and prior advertised window is updated to 800.

A duplicate Ack (1201) is received so S_OUT is now determined to be 0 (1201 sent−1201 acknowledged) at 88. This value is also not employed as a congestion window estimate (indicated by X CWND at 90), as a congestion window value cannot be zero.

A further data sequence 1201 is sent at 92, and S_OUT is 100 (1301 highest sequence expected−1201 acknowledged) at 94, when Ack(1301) is received acknowledging data sequence 1301. This value is also not employed as a congestion window as a Reset from the client is observed immediately after, which then ends the connection.

Throughout the monitoring of the above transactions, the minimum and maximum congestion window size and receiver advertised window size are determined and may be reported as part of the analysis performed by the monitor. In the example above, the monitor provides analysis as follows:

CWND_MIN sender's minimum congestion window≈200

CWND_MAX sender's maximum congestion window≈500

ADV_MIN receiver's minimum advertised window≈200

ADV_MAX sender's maximum advertised window≈1000

The measurement accounts for 'full window' instances, where the outstanding bytes equals advertised window and also accounts for the current advertised window, and for boundary conditions, e.g., end of a transaction, end of a flow on reset (RST), an indication of no more data from sender (FIN), or timeout.

While the illustrated example herein is shown measuring the server's congestion window, a corresponding measurement of the client's congestion window is also provided if desired.

In accordance with the above, the method and apparatus provides an estimate of the amount of the sender's congestion window throughout the life of a TCP flow by observation of traffic on the network. This information can be used for other processing and analysis in network monitoring.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. A method of estimating a sender's congestion window throughout the life of a Transfer Control Protocol (TCP) flow, comprising:
  observing data transmission sequence and sequence expected values from a sender;
  observing receiver advertised window and ACK data and determining an estimated congestion window size based thereon;
  determining an amount of data outstanding (S_OUT) to be sent from the sender;
  determining maximum congestion window estimate during a monitoring period by determining if S_OUT is more than a prior determined maximum value whereby if a prior determined advertised window is less than S_OUT then S_OUT can be used as the congestion window estimate;

determining minimum congestion window estimate during a monitoring period by determining if S_OUT is lower than a prior determined minimum value whereby if a prior determined advertised window is greater than S_OUT then S_OUT can be used as the congestion window estimate: and updating the maximum congestion window estimate or the minimum congestion window estimate to the S_OUT value, if it is determined S_OUT can be used as the congestion window estimate, wherein said determining an amount of data outstanding (S_OUT) to be sent from the sender, further comprises subtracting a last highest acknowledged sequence number from an observed highest outgoing sequence number.

2. A network test instrument for estimating a sender's congestion window, comprising:

a network interface for observing network traffic; and a processor, said processor including employing observed network traffic to determining data transmission sequence values sent from a server and determining receiver advertised window and ACK data and determining an estimated congestion window size based thereon said processor further determining:

an amount of data outstanding (S_OUT) to be sent from the sender;

a maximum congestion window estimate during a monitoring period by determining if S_OUT is more than a prior determined maximum value whereby if a prior determined advertised window is less than S_OUT then S_OUT can be used as the congestion window estimate;

a minimum congestion window estimate during a monitoring period by determining if S_OUT is lower than a prior determined minimum value whereby if a prior determined advertised window is greater than S_OUT then S_OUT can be used as the congestion window estimate; and updating the maximum congestion window estimate or the minimum congestion window estimate to the S_OUT value, if it is determined S_OUT can be used as the congestion window estimate, wherein said determining an amount of data outstanding (S_OUT) to be sent from the sender further comprises subtracting a last highest acknowledged sequence number from an observed highest outgoing sequence number.

* * * * *